United States Patent [19]
Jain et al.

[11] Patent Number: 5,444,608
[45] Date of Patent: Aug. 22, 1995

[54] HIGH FREQUENCY POWER DISTRIBUTION SYSTEM

[75] Inventors: Praveen K. Jain, Kanata; Gary A. Edwards, Carleton Place; Carl Hubbard, Nepean; Douglas R. Bannard, Ottawa, all of Canada

[73] Assignee: Northern Telecom Limited, Montreal, Canada

[21] Appl. No.: 233,600

[22] Filed: Apr. 14, 1994

[51] Int. Cl.6 .............................................. H02M 3/335
[52] U.S. Cl. ........................................ 363/17; 363/132
[58] Field of Search ................ 363/17, 34, 41, 65, 363/67, 95, 98, 131, 132; 307/82

[56] References Cited

U.S. PATENT DOCUMENTS

| | | | |
|---|---|---|---|
| 4,670,832 | 6/1987 | Park | 363/98 |
| 4,860,185 | 8/1989 | Brewer et al. | 363/41 |
| 5,005,112 | 4/1991 | Kuriyama | 363/21 |
| 5,291,383 | 3/1994 | Oughton | 363/17 |

OTHER PUBLICATIONS 20 kHz space station power distribution technology, NASA Publication TM 100781 Irving Hansen & Fredrick Wolff pp. 251-255 1987.
Advanced secondary power system for transport aircraft, NASA Publication TP 2463 May 1985, Anthony C. Hoffman et al, pp. 1-35.
"A cascaded Schwarz converter for high frequency power distribution", B. Ray and T. A. Stuart, IEEE Transactions on Power Electronics, vol. 4, No. 4, Oct. 1989.
"Connectorless power supply for an aircraft-passenger entertainment system", A. Kelley and W. Owens, IEEE Transactions on Power Electronics, vol. 4, No. 3, Jul. 1989.

*Primary Examiner*—Peter S. Wong
*Assistant Examiner*—Adolf Berhane
*Attorney, Agent, or Firm*—Yoshiharu Toyooka

[57] ABSTRACT

Novel high frequency power distribution systems are disclosed. The system of the present invention uses a relatively high frequency AC (e.g. 100 kHz or higher) and distributes it by a high frequency bus which includes magnetic coupling. AC/DC converters are magnetically connected to the bus by way of associated magnetic coupling and rectify the AC to obtain DC power to be used by a respective load. The bus includes an inductive element which, in one embodiment, forms a series resonant circuit with a capacitive element of the AC/DC converter when it is magnetically connected to the bus.

6 Claims, 5 Drawing Sheets

• = Represents Connectors

HF Voltage/Current Distribution

HIGH FREQUENCY POWER DISTRIBUTION SYSTEM

FIELD OF THE INVENTION

The present invention is directed to high frequency power distribution systems. In particular, the invention relates to high frequency power distribution systems in which the power is distributed in sinusoidal voltage and current forms and no connectors are used for power transfer.

BACKGROUND OF THE INVENTION

Future telecommunication systems may require power transfer between power distribution system and electronic cards through magnetic coupling for the following reasons:

(1) increased system reliability
  (a) inherent short-circuit protection at the power interface (fuse-less protection)
  (b) limited power transfer to the load (elimination of fire hazard)
(2) compatibility with electrical connector-less interface (using fiber optical connectors for the signals) in the system.

In order to achieve magnetic coupling, the power distribution system should be of AC type. Furthermore, to reduce the size and volume of the power conversion units, the distribution frequency should be high.

The concept of high frequency power distribution systems was first proposed by NASA some 25 years ago for space applications. Since then, the industry has been working to exploit the potential of this concept for several other applications because of the following features:

high end-to-end system efficiency
distributed heat
hot insertion of electronic cards without active current limiting
point-of-use-regulation.

The following articles describe typical known power distribution systems:

[1] Status of 20 kHz space station power distribution technology, NASA Publication, TM 100781;
[2] Advanced secondary power system for transport aircraft, NASA Publication, TP 2463;
[3] B. Ray and T. A. Stuart, "A cascaded Schwarz converter for high frequency power distribution", IEEE Transactions on Power Electronics, Vol. 4, No. 4, Oct. 1989; and
[4] A. Kelley and W. Owens, "Connectorless power supply for an aircraft-passenger entertainment system", IEEE Transactions on
Power Electronics, Vol. 4, No. 3, July 1989.

There are two types of high frequency distribution systems described in literature and known in industry and FIGS. 1 and 2 of the accompanying drawings illustrate respectively these prior art systems:

(1) High Frequency Sinusoidal Constant Voltage Distribution System; and
(2) High Frequency Sinusoidal Constant Current Distribution System.

High Frequency Sinusoidal Constant Voltage Distribution Systems

FIG. 1 is a conceptual circuit diagram of a known high frequency sinusoidal constant voltage power distribution system. In this type of distribution system, a DC/AC inverter 10 produces a high frequency sinewave AC output voltage from a DC input voltage. The magnitude of the AC voltage is maintained very close to constant against any DC voltage and output load variation. Also the Total Harmonic Distortion (THD) of this AC voltage is kept very low to reduce Electro-Magnetic Interference (EMI).

The high frequency AC produced by the inverter 10 is distributed in the system by a high frequency power distribution circuit to supply power to the electronic load cards. An AC/DC converter 14 is used to provide regulated, essentially ripple free, DC voltage of required magnitude at each electronic card. The inverter and converter operate at a distributing frequency which is relatively high, e.g. higher than 100 kHz. This type of distribution system has the following advantages:

(a) sinusoidal voltage and current wave forms;
(b) significantly reduced EMI; and
(c) high distribution efficiency.

However, at the same time, this type of distribution suffers from the following disadvantages:

(i) each AC/DC converter requires a fuse for short-circuit protection; and
(ii) electrical connectors are required to feed power from power distribution circuit to the electronic cards.

High Frequency Sinusoidal Constant Current Distribution Systems

FIG. 2, on the other hand, shows a conceptual circuit diagram of a known high frequency sinusoidal constant current distribution system. In this type of distribution system, a DC/AC inverter 20 produces a high frequency sinewave AC output current from a DC input voltage source. The magnitude of the AC current is maintained very close to constant against any input DC voltage and output load variation (from output short-circuit to an open-circuit).

The high frequency AC current produced by the inverter is distributed in the system by a high frequency power distribution circuit 22 to supply power to the electronic load cards. An AC/DC converter 24 is used to provide regulated, essentially ripple free DC voltage of required magnitude at each electronic card. The matching/isolating transformer 26 of the AC/DC converter is physically split into two halves—the primary side 28 and secondary side 30. The primary side half core transformers are an integral part of the high frequency power distribution circuit in which all the primaries are connected in series. The secondary side half core transformer is part of the AC/DC converter located on the electronic card. The power is transferred to the load 32 when the secondary side half of the transformer is magnetically coupled to the primary by inserting the card in the system. This type of distribution system has the following advantages:

(a) connector-less power transfer;
(b) fuse-less protection; and
(c) limited power transfer to the load.

However, at the same time, this type of distribution suffers from the following disadvantages:

(i) square wave voltage in the distribution which results in high EMI;
(ii) high voltage surges in the system under open circuit fault conditions; and
(iii) poor distribution efficiency at reduced load power demand.

In summary, the high frequency constant voltage distribution system has the advantages of sinusoidal voltage and current distribution, low EMI, and high overall system efficiency from low-load to full-load, however, it does not provide connector-less power transfer capability. On the other hand, the high frequency constant current distribution system has the capability of connector-less power transfer but suffers from the disadvantages of high EMI and poor low-to-medium load overall system efficiency.

The high frequency power distribution system of the present invention combines the advantage of both the aforementioned distribution systems without any other major drawbacks. Therefore, it has the advantages of sinusoidal voltage and current distribution, low EMI, high overall system efficiency from low-load to full-load, and it is also capable of connector-less power transfer.

OBJECTS OF THE INVENTION

It is therefore an object of the present invention to provide a high frequency power distribution system which is highly efficient and requires no connectors for power transfer.

It is another object of the present invention to provide a high frequency power distribution system in which power flow to the load is limited and no fuses are required for protection.

It is yet a further object of the present invention to provide a high frequency power distribution system which produces low EMI.

SUMMARY OF THE INVENTION

Briefly stated, the present invention relates to a high frequency power distribution system. The system comprises a high frequency AC power supply and a high frequency power distribution circuit connected to the AC power supply at one end. The high frequency power distribution circuit has a plurality of parallel first magnetic coupling means at other ends, each first magnetic coupling means containing a series inductive element. The system further includes a plurality of AC/DC converters, each having a second magnetic coupling means and a series capacitive element. Each of the second magnetic coupling means is capable of being magnetically coupled to the first magnetic coupling means. The system also has a plurality of loads, each connected to the respective AC/DC converter.

DETAILED DESCRIPTION OF THE PREFERRED EMBODIMENTS OF THE INVENTION

Figure 1:
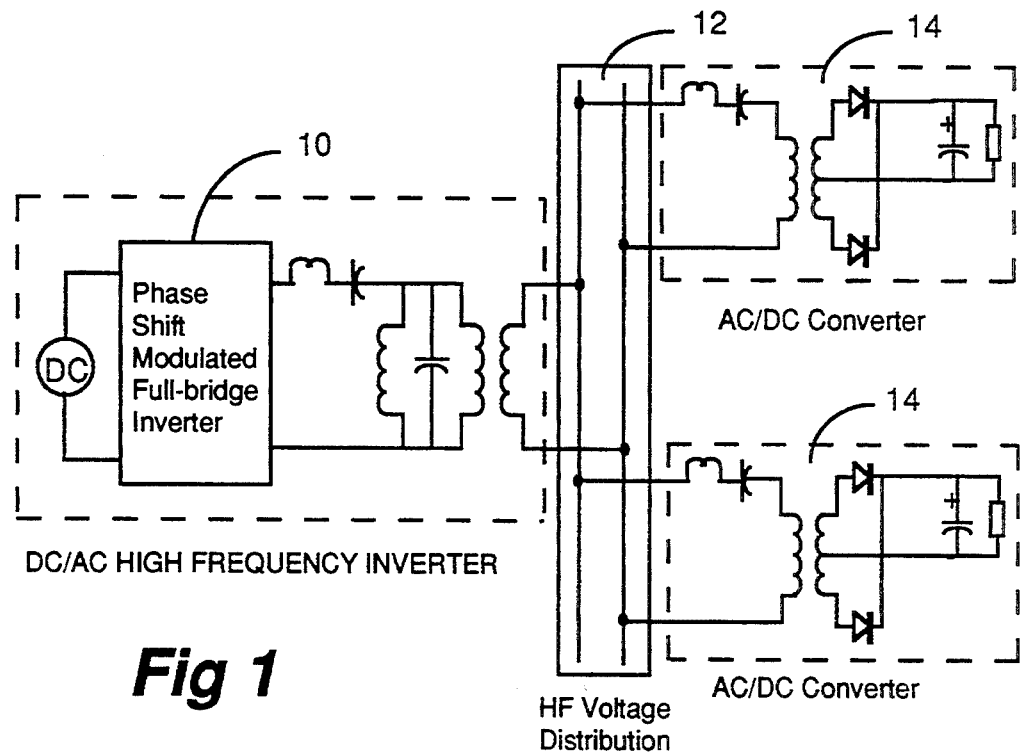
FIG. 1 is a known high frequency constant voltage distribution system.
Figure 2:
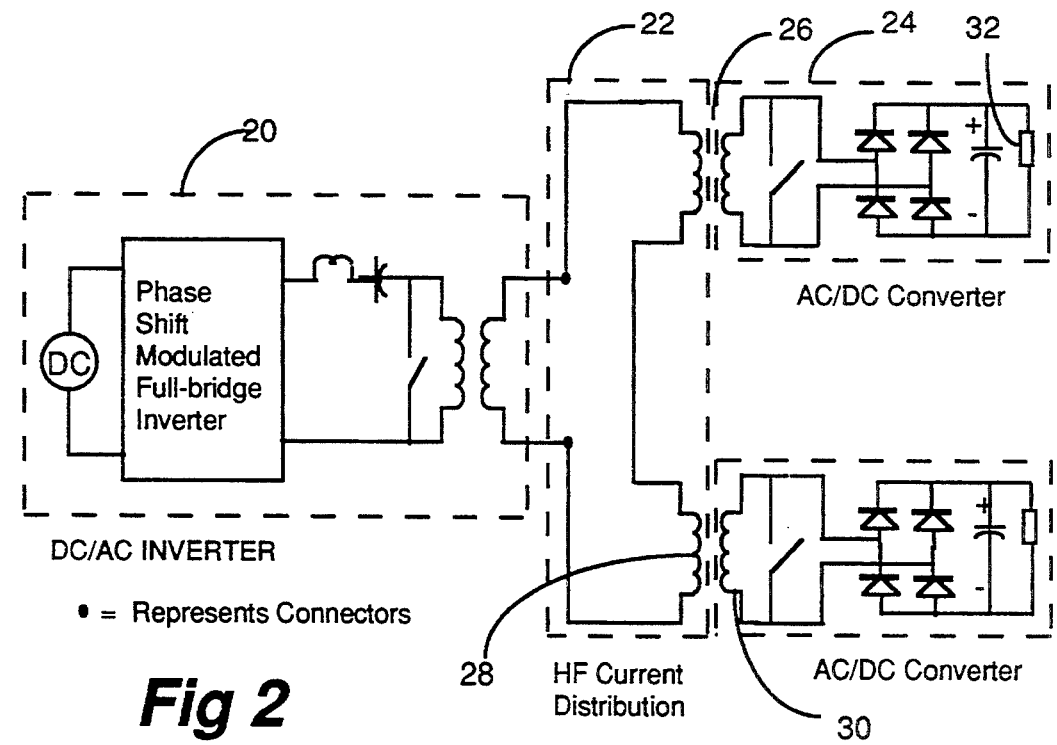
FIG. 2 is a known high frequency constant current distribution system.
Figure 3:
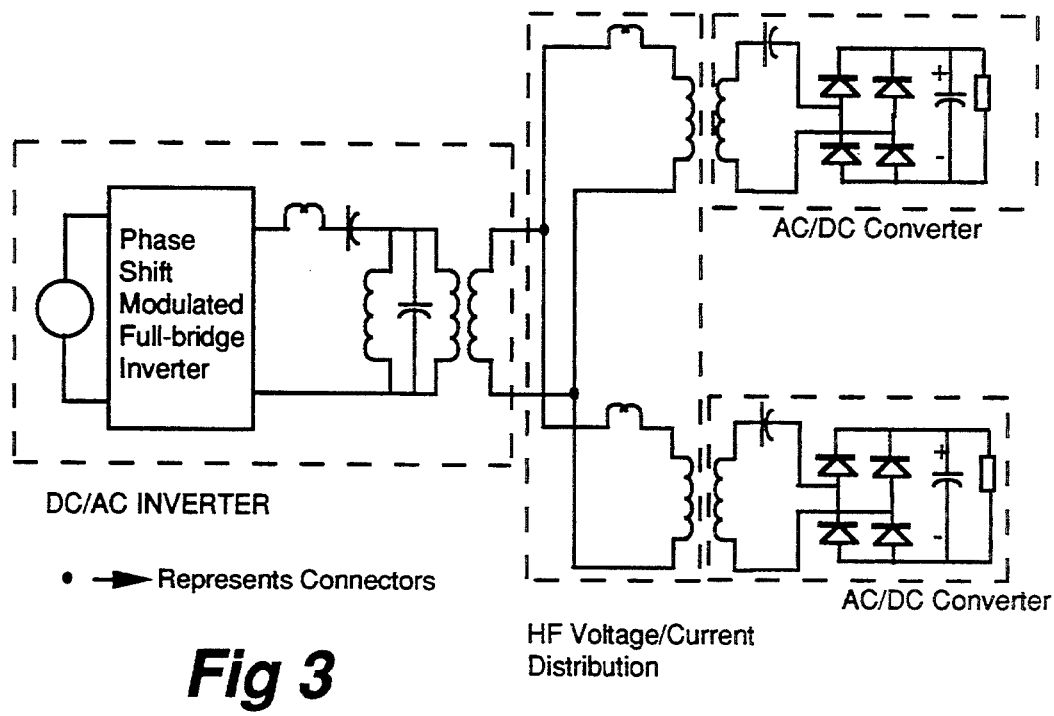
FIG. 3 is a high frequency power distribution system according to one embodiment of the invention.

FIG. 3 shows the high frequency power distribution system according to one embodiment of the present invention. The system is a hybrid architecture which realizes connectorless high frequency sinusoidal voltage and current distribution. The main function of each of the components is described below:

High Frequency Inverter 40

The high frequency inverter 40 converts the input DC voltage (Vi) to single phase high frequency sinusoidal AC output voltage with low Total Harmonic Distortion (THD). The output voltage of the inverter is maintained constant at a desired level against any input voltage and output load variation. Any inverter topology and control technique can be used for DC/AC conversion. One preferred inverter topology is described in U.S. Pat. No. 5,208,738, issued on May 4, 1993 to P. K. Jain. This topology comprises a full-bridge inverter, a double tuned series and parallel resonant network, and an output transformer. It also employs a phase-shift modulation control technique which works well with the present invention.

AC/DC Converter 42

The AC/DC converter 42 consists of a transformer 44, a series resonant circuit, a rectifier bridge 46 and an output filter 48. The series resonant circuit consists of a series inductor Ls and a series capacitor Cs. The series inductor Ls is placed at the primary side of the transformer while the series capacitor Cs is placed at the secondary side of the transformer. Furthermore, the transformer is physically split into two halves- the primary side and the secondary side. The secondary side half transformer is physically part of the AC/DC converter. The series inductor is integrated with the primary side half transformer which is an integral part of the high frequency power distribution circuit.

High Frequency Power Distribution Circuit 50

The power distribution circuit according to the present invention is a combination of voltage type and current type distribution schemes. Like the voltage type distribution scheme, the DC/AC inverter 40 forms a voltage source and is connected in parallel to the power distribution circuit. Like the current type distribution scheme, the primary side half transformers 52 are integral parts of the distribution circuit, however, their primary windings are connected in parallel. The AC/DC converters are, therefore, connected in parallel to the power distribution circuit once their secondaries 54 are magnetically coupled to the primaries by bringing together the two halves of the transformers.

The above hybrid power distribution system operates in the following modes:

(a) power transfer mode;

(b) no-load mode; and (c) short-circuit mode.

Power Transfer Mode

This mode of operation is obtained when the two halves of the transformer are brought together so that the primary and secondary are magnetically coupled. In operation, a high frequency sinusoidal constant distribution voltage Vs is applied across the series inductor and the primary of the transformer. Since both the primary and secondary are magnetically coupled, the inductive impedance of the primary series inductor Ls and secondary series capacitor Cs is in series with the output rectifier and load. The values of both the series inductor and capacitor are chosen such that their impedances are equal at the distribution frequency. Equal inductive and capacitive impedances in series cancel the inductive and capacitive voltage drops across the combination of Ls and Cs. This allows maximum power transfer from the high frequency power distribution circuit to the load.

Figure 4:
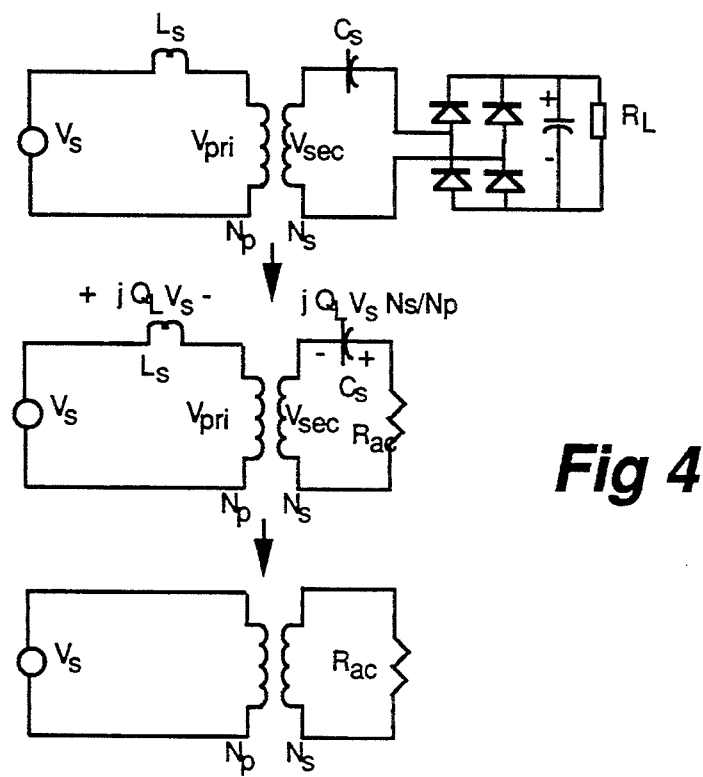
FIG. 4 is a set of equivalent circuits of the present invention during power transfer mode of operation.

FIG. 4 shows the equivalent circuits in this mode of operation.

The voltage appearing across the primary of the transformer is approximately given by:

$$Vpri = (1+Q_L^2)^{\frac{1}{2}} Vs \qquad (1)$$

where:

$$Q_L = \text{loaded quality factor of the series resonant circuit} \qquad (2)$$
$$= 2\pi f Ls/Rac(Ns/Np)^2$$

Vs = RMS distribution voltage
Rac = equivalent load resistance $= 8/\pi^2 R_L$
$R_L$ = output load resistance
Np = primary number of turns of the transformer
Ns = secondary number of turns of the transformer.

Typically $Q_L > 3$, therefore the primary voltage Vpri can be approximated as:

$$Vpri = Q_L Vs \qquad (3)$$

The secondary side voltage Vsec across the transformer is given by:

$$Vsec = (Ns/Np) Q_L Vs \qquad (4)$$

The maximum operating flux $\Phi_o$ of the transformer core is given by:

$$\Phi_o = 1.414\, Vs/Np\, (Ns/Np)^2 Ls/Rac \qquad (5)$$

For a given application, the distribution voltage Vs, turns-ratio Ns/Np and the series inductor Ls are fixed. Therefore, the maximum operating flux $\Phi_o$ is inversely proportional to the output load resistance Rac. For proper operation of the proposed system the maximum operating flux density should be close to the transformer's core material flux density.

The power transfer P from the source to the load is given by:

$$P = Vs^2/Rac(Ns/Np)^2 \qquad (6)$$

This is the maximum power transfer from source to the load because any reduction in the resistance Rac, to increase the power transfer from the rated value, will result in increased operating flux value to which will saturate the transformer.

No-Load Mode

Figure 5:
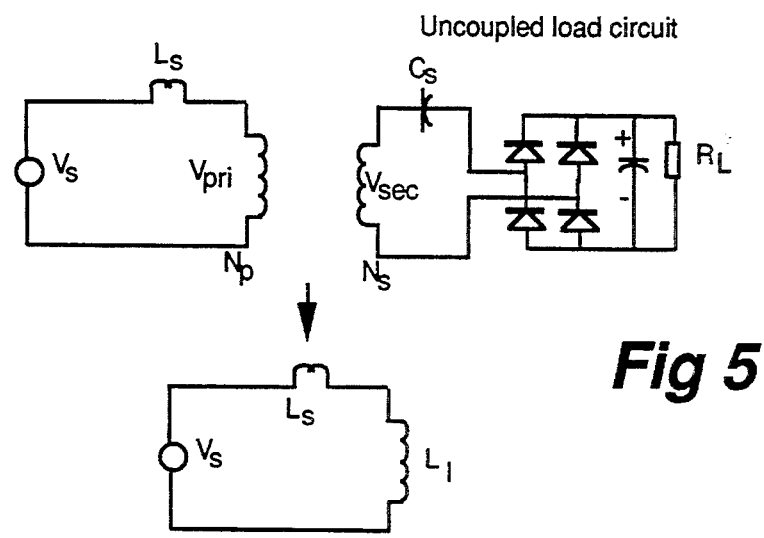
FIG. 5 is a set of equivalent circuits of the present invention during no-load mode of operation.

This mode of operation occurs when the secondary half of the transformer is not connected. In this mode of operation the high frequency distribution voltage Vs is applied across the combination of the series inductor Ls and the primary of the transformer. Since the secondary half of the transformer is not connected, the primary winding flux is not linking the secondary winding. Thus the series inductor and the leakage inductor of the transformer are in series and offer high impedance across the distribution voltage Vs. FIG. 5 shows the equivalent circuit of the system during this mode. The current $I_{pNL}$ drawn by the primary of the transformer is given by:

$$I_{pNL} = Vs/(Xs + X1) \qquad (7)$$

where:
Xs = $2\pi f$ Ls = series impedance
X1 = $2\pi f$ L1 = leakage impedance

The series impedance is high (approximately 4 times the equivalent output resistive load), therefore, the no-load current $I_{pNL}$ drawn at the primary is low.

Short-Circuit Mode

Figure 6:
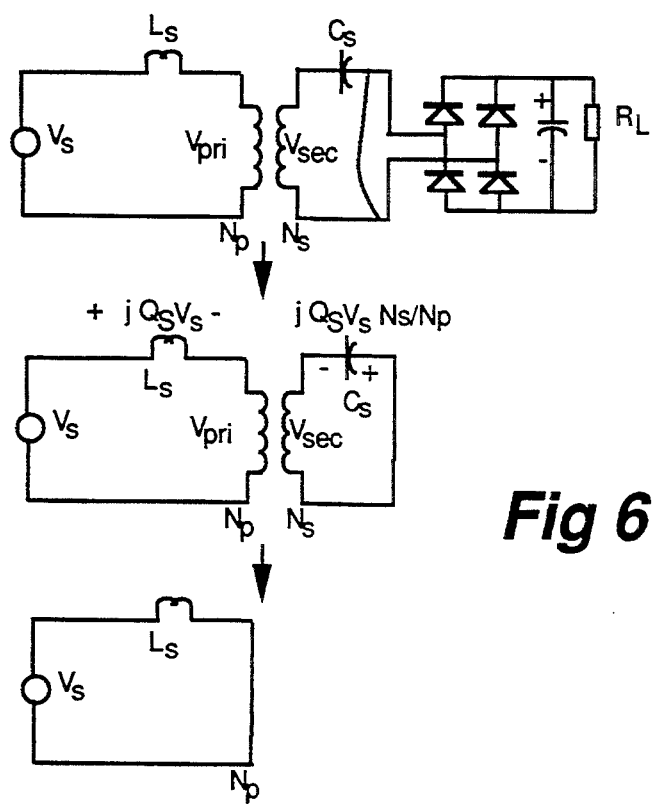
FIG. 6 is a set of equivalent circuits of the present invention during short circuit mode of operation.

The primary and secondary of the transformer are magnetically coupled. When a short-circuit occurs at a stage after the series capacitor Cs, e.g. either at the input of diode rectifier or at the output of the DC voltage, the current drawn at the point of coupling (primary current) would be low and would be limited by the series inductor Ls. This is because a high voltage appears across the secondary of the transformer, resulting in its saturation. The saturation of the transformer connects the high impedance of the series inductor directly across the distribution voltage, thereby limiting the input current. The high voltage across the secondary of transformer is the result of a substantially increased quality factor of the series resonant circuit in the short-circuit mode. FIG. 6 shows the equivalent circuits in this mode of operation. The resultant circuit in this mode is similar to the circuit as shown in FIG. 5 for the no-load operation. Therefore, the equation (7) also applies for this mode which clearly describes the current limiting feature.

Performance Characteristics

It has been explained in the above discussion that the high frequency hybrid distribution system according to the present invention has limited power transfer from source/distribution to the load, inherent current limiting against a short-circuit, and no-load/open-circuit operation. The steady-state performance of the system with respect to (i) power factor, (ii) overall power conversion and distribution losses, and (iii) efficiency is more closely investigated below. To study these performance characteristics, a realistic design example with the following details is considered.

| DC/AC Inverter: | |
|---|---|
| Input voltage: | 39 V to 75 V DC |
| Output voltage: | 30 V RMS |
| Output power: | 300 W |
| Total Harmonic Distortion: | <2% |
| Inverter topology: | Double tuned resonant |
| Distribution System: | |
| Distribution frequency: | 128 kHz |
| Distribution voltage: | 30 V RMS |
| AC/DC Converter: | |
| Output power: | 30 W |
| Output voltage: | 5 V DC |
| Number of load cards with AC/DC Converter: | 10 |

Power Factor

Figure 7:
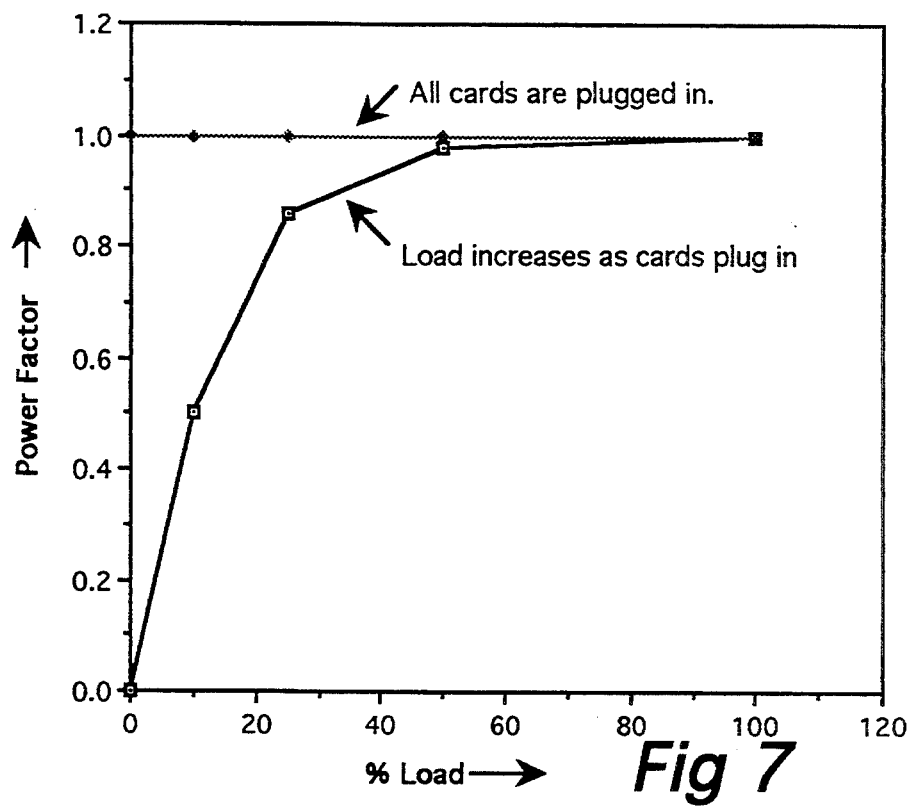
FIG. 7 is a graph showing power factor as a function of output load.

FIG. 7 shows the power factor of the hybrid distribution system of the present invention. This figure shows that the power factor is near unity and is independent of load if all the cards are plugged into the system. This is because the series resonant branch, under this condition, is tuned at the distribution frequency and the impedance appearing at the distribution bus is resistive. However, on the other hand, the power factor decreases with the decreasing number of cards in the system. This is because unplugged cards in the system offer inductive impedance (series inductances) in parallel to the resistive impedance offered by the plugged cards (tuned circuits with output resistive loads). Although the power factor of the system is lower than 0.8 for the output load below 20%, the total system losses are quite small compared to the losses at the rated load.

Power Losses

Figure 8:
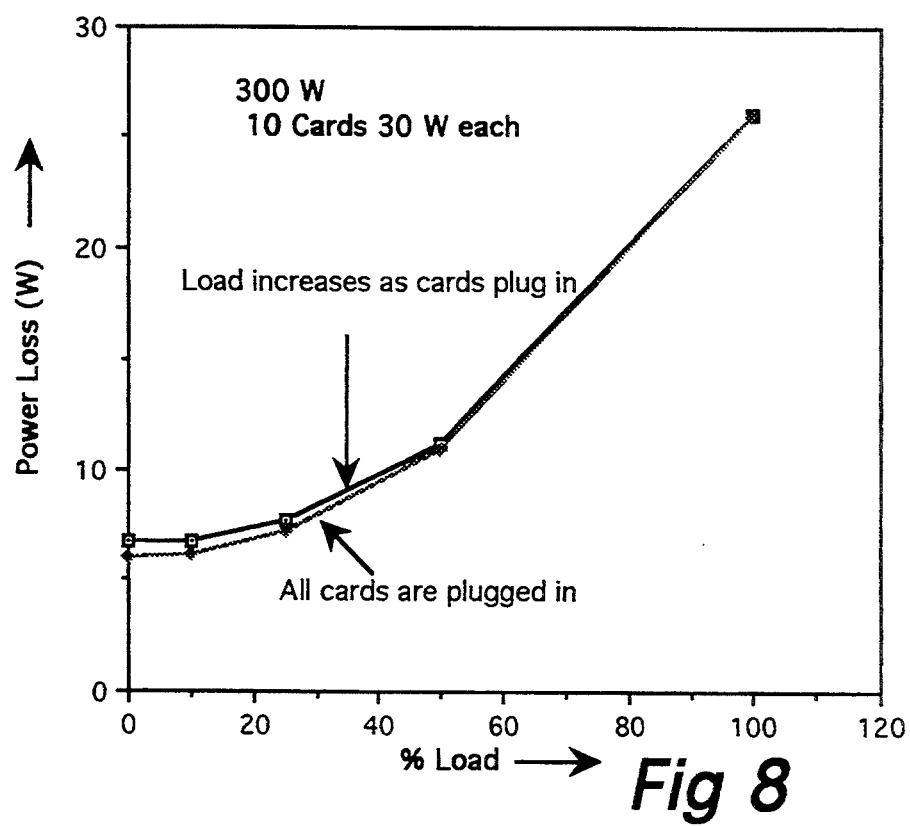
FIG. 8 is a graph showing overall power losses a function of output load.

FIG. 8 shows the total power losses in the system (including DC/AC inverter, distribution and AC/DC converter) as a function of output load. It is seen from this figure that the overall system losses decrease as the load demand on the system is lowered. However, below a 40% load, the losses decrease slightly. This is mainly due to the load independent losses of the DC/AC inverter. Further, it is noted from this figure that the difference between overall losses is negligible, whether the output load seen by the high frequency distribution system is reduced by unplugging the cards or by reducing the DC output load. This emphasizes the fact that the lower power factor, as shown in FIG. 7.0, does not contribute towards the increased losses.

Efficiency

Figure 9:
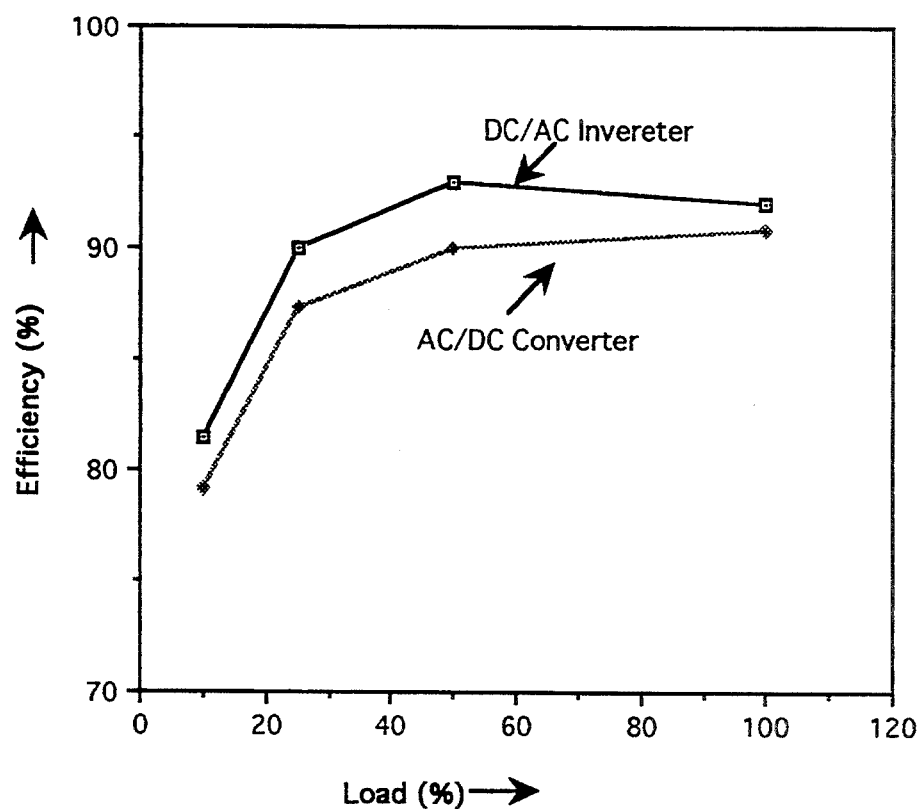
FIG. 9 is a graph showing efficiency of DC/AC inverter and AC/DC converter.

FIG. 9 shows the typical efficiency of the DC/AC inverter and AC/DC converter. This figure shows that both the inverter and converter circuits have near constant and high efficiency from 25% load to 100% load.

The high frequency distribution system of the present invention combines the advantages of both constant voltage and constant current type of high frequency distribution systems and has the following advantages:
connectorless power transfer
fuse-less protection at the point of load coupling
sinusoidal voltage and current distribution
high overall system efficiency from full to ¼ load
limited power flow to the load
low EMI.

We claim:

1. A high frequency power distribution system comprising:
   a high frequency AC power supply for supplying a substantially sinusoidal voltage and sinusoidal current at a substantially constant high frequency;
   a high frequency power distribution circuit connected to the AC power supply at one end and having a plurality of parallel first magnetic coupling means at other ends, each of the first magnetic coupling means containing a series inductive element;
   a plurality of AC/DC converters, each having a second magnetic coupling means and a series capacitive element, each of the second magnetic coupling means capable of being magnetically coupled to a corresponding one of the first magnetic coupling means; and
   a plurality of loads, each connected to the respective AC/DC converter.

2. A high frequency power distribution system according to claim 1, wherein the series inductive element and series capacitive element form a series resonant circuit when the first and second magnetic coupling means are magnetically coupled, the series resonant circuit being tuned to a relatively high frequency.

3. A high frequency power distribution system according to claim 2, wherein the first and the second magnetic coupling means comprise windings of predetermined turns so that when the windings of the first and second magnetic coupling means are positioned close to one another, they couple magnetically to transfer electrical energy from one to the other.

4. A high frequency power distribution system according to claim 3, wherein the high frequency AC power supply comprises a DC/AC inverter operating at a relatively high frequency.

5. A high frequency power distribution system according to claim 4, wherein the relatively high frequency is higher than 100 kHz.

6. A high frequency power distribution system according to claim 5, wherein the series inductive element is an integral part of the winding.

* * * * *